US012756793B2

(12) United States Patent
Shi et al.

(10) Patent No.: US 12,756,793 B2
(45) Date of Patent: Oct. 6, 2026

(54) VIDEO RECORDING METHOD AND APPARATUS, DEVICE, STORAGE MEDIUM, AND PROGRAM PRODUCT

(71) Applicant: Beijing Zitiao Network Technology Co., Ltd., Beijing (CN)

(72) Inventors: Lei Shi, Beijing (CN); Mingyi Li, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 21 days.

(21) Appl. No.: 18/868,689

(22) PCT Filed: Jul. 27, 2023

(86) PCT No.: PCT/CN2023/109501
§ 371 (c)(1),
(2) Date: Nov. 22, 2024

(87) PCT Pub. No.: WO2024/022427
PCT Pub. Date: Feb. 1, 2024

(65) Prior Publication Data
US 2025/0343872 A1 Nov. 6, 2025

(30) Foreign Application Priority Data
Jul. 28, 2022 (CN) ......................... 202210903690.6

(51) Int. Cl.
*H04N 7/01* (2006.01)
*H04N 19/40* (2014.01)
*H04N 23/63* (2023.01)

(52) U.S. Cl.
CPC ........... *H04N 7/0127* (2013.01); *H04N 19/40* (2014.11); *H04N 23/632* (2023.01)

(58) Field of Classification Search
CPC .... H04N 7/0127; H04N 19/40; H04N 23/632; H04N 7/01; H04N 19/146; H04N 23/63; H04N 23/951; H04N 5/76; H04N 5/92
See application file for complete search history.

(56) References Cited

U.S. PATENT DOCUMENTS

2014/0269927 A1* 9/2014 Naletov ................ H04N 19/14
375/240.18

FOREIGN PATENT DOCUMENTS

CN 106993187 A 7/2017
CN 108093257 A 5/2018
(Continued)

OTHER PUBLICATIONS

Office Action for Chinese Patent Application No. 202310186781.7, mailed on Mar. 26, 2025, 15 pages.
(Continued)

*Primary Examiner* — Mekonnen D Dagnew
(74) *Attorney, Agent, or Firm* — Astute IP Law Group

(57) ABSTRACT

The present disclosure relates to a video recording method and apparatus, a device, a storage medium, and a program product. The method comprises: in the process of video recording, acquiring a video frame to be recorded, and previewing said video frame; then determining a preview frame rate in the preview process of said video frame; if the preview frame rate is a first frame rate, encoding said video frame in a first format to obtain encoded data, and if the preview frame rate is a second frame rate, encoding said video frame in a second format to obtain encoded data, wherein the encoding frame rate corresponding to the first format is greater than the encoding frame rate corresponding to the second format; and finally, generating a recorded video on the basis of the encoded data.

18 Claims, 3 Drawing Sheets

(56) References Cited

FOREIGN PATENT DOCUMENTS

| | | | |
|---|---|---|---|
| CN | 111385637 | A | 7/2020 |
| CN | 113473204 | A | 10/2021 |
| CN | 114245196 | A | 3/2022 |
| CN | 115379136 | A | 11/2022 |
| KR | 10-2013-0094632 | A | 8/2013 |
| WO | 2022184077 | A1 | 9/2022 |

OTHER PUBLICATIONS

International Search Report and Written Opinion received for PCT Patent Application No. PCT/CN2023/109501, mailed on Nov. 5, 2023, 11 pages (5 pages of English Translation and 6 pages of Original Document).

* cited by examiner

VIDEO RECORDING METHOD AND APPARATUS, DEVICE, STORAGE MEDIUM, AND PROGRAM PRODUCT

The present application is a National Phase Application of International Application No. PCT/CN2023/109501, which is based on and claims priority to Chinese Application No. 202210903690.6 filed on Jul. 28, 2022, the disclosures of both applications are incorporated by reference herein in their entireties.

TECHNICAL FIELD

The present disclosure relates to the field of video processing technologies, and in particular a video recording method and apparatus, a device, a storage medium, and a program product.

BACKGROUND

With the rapid development of Internet technologies and intelligent terminals, intelligent terminals are more and more widely used in people's lives and work. With the continuous development of intelligent terminals, people will use intelligent terminals to record videos.

SUMMARY

In order to solve the above technical problem, embodiments of the present disclosure provide a video recording method and apparatus, a device, a storage medium, and a program product.

According to a first aspect, an embodiment of the present disclosure provides a video recording method, which comprises:

acquiring to-be-recorded video frames and previewing the to-be-recorded video frames in a video recording process;

determining a preview frame rate in the process of previewing the to-be-recorded video frames;

encoding the to-be-recorded video frames in an encoding format corresponding to the preview frame rate so as to obtain encoded data, wherein, if the preview frame rate is a first frame rate, then the encoding format is a first format; if the preview frame rate is a second frame rate, then the encoding format is a second format; the first frame rate is larger than the second frame rate, and an encoding frame rate corresponding to the first format is larger than the encoding frame rate corresponding to the second format;

generating a recorded video based on the encoded data.

According to a second aspect, an embodiment of the present disclosure provides a video recording apparatus, which comprises:

a video preview module for acquiring to-be-recorded video frames and previewing the to-be-recorded video frames in a video recording process;

a preview frame rate determination module for determining a preview frame rate in the process of previewing the to-be-recorded video frames;

a video encoding module for encoding the to-be-recorded video frames in an encoding format corresponding to the preview frame rate so as to obtain encoded data, wherein, if the preview frame rate is a first frame rate, then the encoding format is a first format; if the preview frame rate is a second frame rate, then the encoding format is a second format; the first frame rate is larger than the second frame rate, and an encoding frame rate corresponding to the first format is larger than the encoding frame rate corresponding to the second format;

a video generation module for generating a recorded video based on the encoded data.

According to a third aspect, an embodiment of the present disclosure provides an electronic device, which comprises:

one or more processors;

a storage means for storing one or more programs;

wherein the one or more programs, when executed by the one or more processors, cause the one or more processors to implement the video recording method according to any of the above first aspect.

According to a fourth aspect, an embodiment of the present disclosure provides a computer readable storage medium storing thereon a computer program which, when executed by a processor, implements the video recording method according to any of the above first aspect.

According to a fifth aspect, an embodiment of the present disclosure provides a computer program product comprising a computer program or instructions which, when executed by a processor, implement the video recording method according to any of the above first aspect.

According to a sixth aspect, an embodiment of the present disclosure provides a computer program comprising instructions which, when executed by a processor, implement the video recording method according to any of the above first aspect.

The embodiments of the present disclosure provide a video recording method and apparatus, a device, a storage medium, and a program product, comprising: acquiring to-be-recorded video frames and previewing the to-be-recorded video frames in a video recording process; then determining a preview frame rate in the process of previewing the to-be-recorded video frames; if the preview frame rate is a first frame rate, then encoding the to-be-recorded video frames in a first format so as to obtain encoded data; if the preview frame rate is a second frame rate, then encoding the to-be-recorded video frames in a second format so as to obtain encoded data; an encoding frame rate corresponding to the first format is larger than the encoding frame rate corresponding to the second format; and then generating a recorded video based on the encoded data.

BRIEF DESCRIPTION OF THE DRAWINGS

The above and other features, advantages and aspects of embodiments of the present disclosure will become more apparent by referring to the following specific implementations when taken in conjunction with the accompanying drawings. Throughout the drawings, the same or similar reference numerals indicate the same or similar elements. It should be understood that the drawings are schematic, and components and elements are not necessarily drawn to scale.

DETAILED DESCRIPTION

Figure 1:
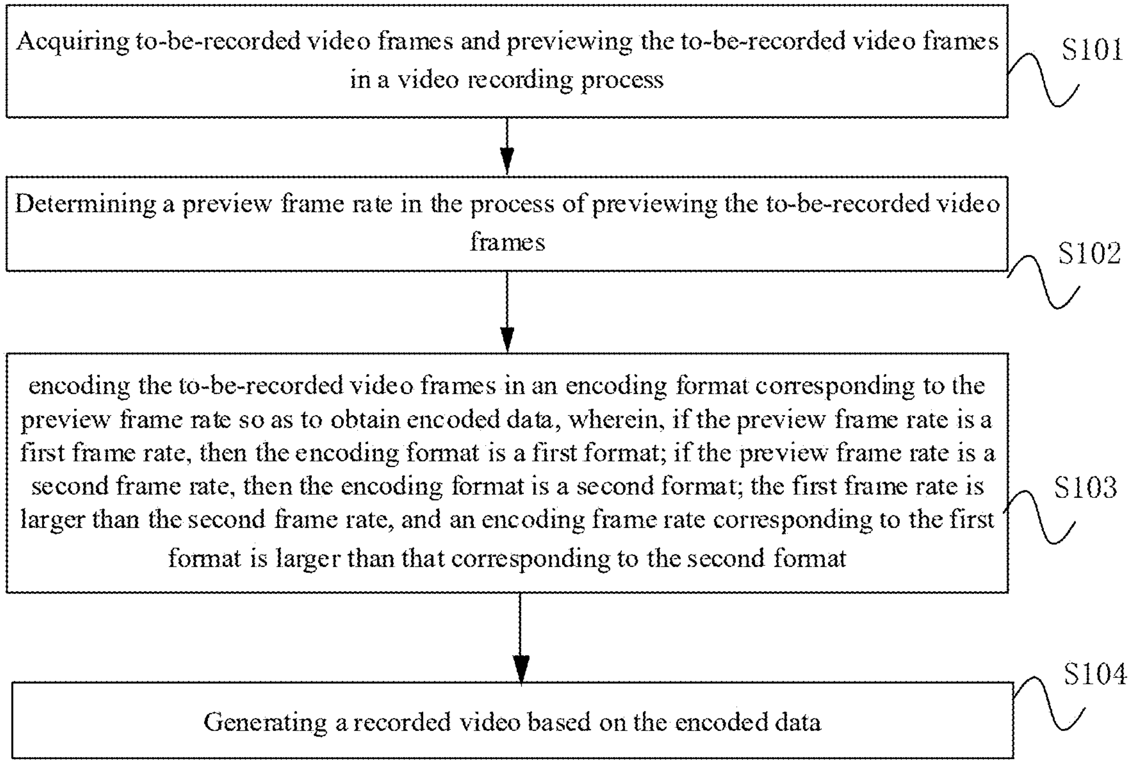
FIG. 1 is a schematic flow diagram of a video recording method in an embodiment of the present disclosure.

Embodiments of the present disclosure will be described in more detail below with reference to the accompanying drawings. Although some embodiments of the present disclosure are shown in the drawings, it should be understood that the present disclosure can be implemented in various forms and should not be construed as limited to the embodiments set forth here, but rather, these embodiments are provided for a more thorough and complete understanding of the present disclosure. It should be understood that the drawings and embodiments of the present disclosure are only used for illustrative purposes, and are not used to limit the protection scope of the present disclosure.

It should be understood that the steps described in the method implementations of the present disclosure can be performed in a different order and/or in parallel. Furthermore, method implementations can include additional steps and/or omit performing the illustrated steps. The scope of the present disclosure is not limited in this respect.

As used herein, the term "including" and its variants are open-ended including, that is, "including but not limited to". The term "based on" is "at least partially based on". The term "one embodiment" means "at least one embodiment"; the term "another embodiment" means "at least one other embodiment"; the term "some embodiments" means "at least some embodiments". Related definitions of other terms will be given in the following description.

It should be noted that "first", "second", and other concepts mentioned in the present disclosure are only used to distinguish different means, modules or units, and are not used to limit the order or interdependence of the functions executed by these means, modules or units.

It should be noted that the modifications of "one" and "a plurality of" mentioned in the present disclosure are schematic rather than limiting, and those skilled in the art should understand that unless the context clearly indicates otherwise, they should be understood as "one or a plurality of".

Names of messages or information exchanged among a plurality of means in the implementations of the present disclosure are only used for illustrative purposes, and are not used to limit the scope of these messages or information.

In the process of recording a video with an intelligent terminal, there will be an unreasonable loss of video frame rate, which leads to a low frame rate of the recorded video and a poor subsequent viewing experience of users.

In some intelligent terminals, the default video encoding format is the H264 encoding format. Since the H264 encoding format adopts a high compression rate encoding mode, the loss of video frame rate is large in the encoding process. For example, in the video recording process, the preview frame rate is 30 fps, and after the video is encoded in the H264 encoding format, the obtained encoded frame rate is only 10 fps.

In order to solve the above problem, an embodiment of the present disclosure provides a video recording method, which can reduce the loss of video frame rate, improve the video recording frame rate and the subsequent viewing experience of users by selecting an appropriate encoding mode for encoding based on the preview frame rate in the video recording process. The video recording method proposed in the embodiment of the present disclosure is mainly applied to a terminal device with an encoding frame rate much lower than the preview frame rate, which reduces the loss of video frame rate in the encoding process and improves the video recording frame rate. The video recording method proposed by the embodiment of the present application will be introduced in detail in conjunction with the drawings.

FIG. 1 is a flow diagram of a video recording method in an embodiment of the present disclosure. The present embodiment is applicable to the case of recording videos. The method can be executed by a video recording apparatus, which can be implemented in software and/or hardware and can be configured in an electronic device.

For example, the electronic device can be a mobile terminal, a fixed terminal or a portable terminal, such as mobile phone, site, unit, device, multimedia computer, multimedia tablet, Internet node, communicator, desktop computer, laptop computer, notebook computer, netbook computer, tablet computer, personal communication system (PCS) device, personal navigation device, personal digital assistant (PDA), audio/video player, digital camera/camcorder, positioning device, television receiver, and radio broadcast receiver, E-book device, game device, or any combination thereof, including accessories and peripheral devices of these devices or any combination thereof.

For another example, the electronic device can be a server, wherein the server can be an entity server or a cloud server, and the server can be a server or a server cluster.

As shown in FIG. 1, the video recording method provided by the embodiment of the present disclosure mainly includes the following steps S101~S104.

S101, acquiring to-be-recorded video frames and previewing the to-be-recorded video frames in a video recording process.

In one implementation of the present disclosure, video recording is started after receiving a video recording instruction, which can be a user's trigger operation on a video recording button. The above video recording button can be a physical button or a virtual control. The virtual control can be a control in a video shooting client or a control in other client, such as an instant messaging client, a shopping client, etc., which is not specifically limited in the present embodiment. Further, receiving the video recording instruction can also mean that the device automatically generates and receives the video recording instruction after completing execution of a certain instruction or function, for example, receiving a video recording instruction after completing execution of a countdown function, or receiving a video recording instruction after playback of a certain video is ended.

Further, the above video recording can be a recorded video or a live video, which is not specifically limited by the embodiment of the present disclosure.

The video is formed by combining countless pictures, each of which is a video frame. The to-be-recorded video frame can be understood as an image texture which is captured by the camera and not subject to the encoding process. Acquiring the to-be-recorded video frame scan be acquiring the captured image textures from the camera component.

Further, previewing the to-be-recorded video frames can be understood as displaying the image textures captured by the camera on the display interface of the terminal device in the video shooting process.

Figure 2:
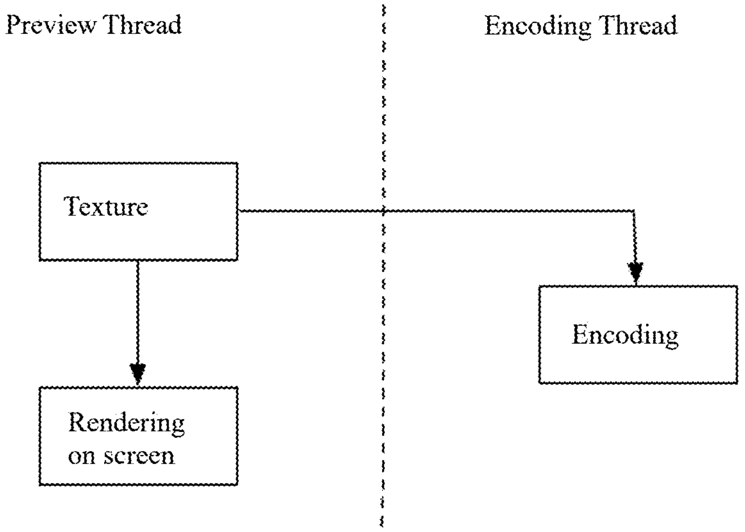
FIG. 2 is a schematic diagram of texture picture rendering and encoding in an embodiment of the present disclosure.

In one embodiment of the present disclosure, as shown in FIG. 2, after the camera of the terminal device captures a frame of image texture, the image texture will be subject to different operations in a preview thread and an encoding thread respectively. In the preview thread, the image texture will be rendered on the screen, that is, the image texture will be rendered and then displayed on a display interface of the terminal device. At the same time, in the encoding thread, the captured image texture is encoded, so that the image texture can be stored or published in the form of image code.

S102, determining a preview frame rate in the process of previewing the to-be-recorded video frames.

The frame rate is a measure used for measuring the number of displayed frames, and the measurement unit is "number of displayed frames per second (fps)", which is generally used for describing how many frames are played per second for a video, an electronic painting or a game. The number of frames refers to a shortened form of the number of frames generated, and each frame is a still image. Due to the visual persistence characteristics of human eyes, if the screen frame rate is higher than 10 to 12 frames, it will be considered coherent.

The preview frame rate refers to the number of rendered image textures per second in the above preview thread, namely, the number of image textures that can be updated per second on the display interface of the terminal device.

In the embodiment of the present disclosure, the preview frame rate in the video frame preview process can be acquired by a frame rate test unit provided in the terminal device, or by a specifically built frame rate test unit. The frame rate test unit can test the preview frame by any or a combination of multiple methods as follows: a frame number under fixed-time method, a time under fixed-frame number method, a real-time calculation method, a total averaging method, an accurate sampling method, an average sampling method, etc.

S103, encoding the to-be-recorded video frame in an encoding format corresponding to the preview frame rate so as to obtain encoded data; wherein, if the preview frame rate is a first frame rate, then the encoding format is a first format; if the preview frame rate is a second frame rate, then the encoding format is a second format; the first frame rate is larger than the second frame rate, and an encoding frame rate corresponding to the first format is larger than that corresponding to the second format.

Different preview frame rates correspond to different encoding formats, and different encoding formats correspond to different encoding frame rates. According to the preview frame rate, a corresponding encoding format is determined, whereby to perform encoding in that encoding format.

The encoding is to compress the video and represent it in the form of code. The video recording technology is a way to convert a file in a certain video format into a file in another video format through a specific compression technology. The video recording format comes from the video recording standards formulated in the industry, and its main purpose is to reduce the storage space of video files on the premise of ensuring a certain video definition.

The present disclosure does not specifically limit the second format and the first format, but requires that these two encoding formats can be converted to each other. For example, the second format is set to the H264 encoding format, and the first format is set to the MPEG-4. Video data can be converted between the two formats. The H264 encoding format is a block-oriented video recording standard based on motion compensation, which has become one of the most commonly used formats for high-precision video recording, compression and publication at present. The MPEG-4 is a set of compression encoding standards for audio and video information.

In one implementation of the present disclosure, whether the preview frame rate is the first frame rate or the second frame rate is determined according to the relationship between the preview frame rate and a preset frame rate. Specifically, the preview frame rate is compared with the preset frame rate, and if the preview frame rate is larger than or equal to the preset frame rate, it indicates that the preview frame rate is the first frame rate, and if the preview frame rate is less than the preset frame rate, it indicates that the preview frame rate is the second frame rate. Optionally, the preset frame rate is 12 fps.

Specifically, the encoding frame rate corresponding to the first format is larger than that corresponding to the second format. Therefore, when the preview frame rate is the first frame rate, that is, when the preview frame rate is larger than or equal to the preset frame rate, the to-be-recorded video frames are encoded in the first format so as to reduce the loss of frame rate in the video recording process. When the preview frame rate is the second frame rate, that is, when the preview frame rate is less than the preset frame rate, the to-be-recorded video frames will be encoded in the second format so as to increase the video recording speed and reduce the time consumption of video recording.

In one possible implementation, if the preview frame rate is the first frame rate, the encoding format is the first format, including: if the preview frame rate is the first frame rate and a terminal supports the first format, then the encoding format is the first format.

The terminal supporting the first format can be understood as that the hardware and/or software of the terminal device has the ability to perform video encoding in the first format.

In one implementation of the present disclosure, after determining that the preview frame rate is larger than or equal to the preset frame rate, it is also necessary to judge whether the terminal device can support encoding in the first format. If the terminal device supports encoding in the first format, then the to-be-recorded video frames are encoded in the first format. If the terminal device does not support encoding in the first format, then the to-be-recorded video frames are encoded in a default encoding format of the terminal device.

In one possible implementation, after judging that the preview frame rate is larger than or equal to the preset frame rate, whether the terminal device supports the MPEG-4 encoding format is judged. If the terminal device supports the MPEG-4 encoding format, then the to-be-recorded video frames are encoded in the MPEG-4 encoding format. If the terminal device does not support the MPEG-4 encoding format, then the to-be-recorded video frames are encoded in the default H264 encoding format of the terminal device.

In the present embodiment, only when the terminal device supports the MPEG-4 encoding format, the encoding can be performed in the MPEG-4 encoding format, and when the terminal device does not support the MPEG-4 encoding format, the encoding is performed in the default H264 encoding format. In this way, the video recording method provided in the present embodiment can be used only for terminal devices supporting the MPEG-4 encoding format, thus avoiding all terminal devices from replacing and using the MPEG-4 encoding format for video recording.

In one implementation of the present disclosure, if the encoding format is a first format, then encoding the to-be-recorded video frames in an encoding format corresponding to the preview frame rate so as to obtain encoded data includes: encoding the to-be-recorded video frames in the first format and a first code rate so as to obtain encoded data, wherein the first code rate is N times a second code rate, N is larger than or equal to 2, and the second code rate is a code rate corresponding to the second format.

The code rate, also known as the bit rate, is a video or audio data volume per unit time. The bit rate decides the degree of video compression by an encoder and is a key factor leading to the final quality and file size of the video. The higher the bit rate, the higher the video quality and the larger the video file. There is a certain relationship between both the code rate and the frame rate of the video. Under the same frame rate, the greater the degree of video compression, that is, the smaller the code rate, the worse the final video quality will be. Similarly, for videos with a higher frame rate, a larger code rate is usually needed to have better video effects.

Specifically, different encoding formats have great differences in complexity and encoding time consumption, and even in the same bit rate, the video display effects will be quite different. In the embodiment of the present disclosure, the encoding frame rate of the first format is larger than that of the second format. In order to improve the video quality and have better video effects, when encoding is performed in the first format, a larger code rate is used.

Optionally, the first code rate corresponding to the first format is twice the second code rate corresponding to the second format.

In the embodiment of the present disclosure, the first code rate corresponding to the first format is twice the second code rate corresponding to the second format, which will significantly improve the video quality and have better video effects.

S104, generating a recorded video based on the encoded data.

Specifically, after the to-be-recorded video frames are encoded in the second format, the obtained encoded data is a video code stream, and the video code stream is packaged by using the video package technology to obtain a video package file, namely, a recorded video.

In one implementation of the present disclosure, generating a recorded video based on the encoded data includes: converting the encoded data obtained based on the first format into encoded data corresponding to the second format; generating a recorded video based on the encoded data corresponding to the second format.

Specifically, a compression rate of the first format is lower than that of the second format. Therefore, when encoding is performed in the first format, a large encoded data file is obtained, which may reduce the transmission efficiency. In the embodiment of the present disclosure, the encoded data obtained by performing encoding in the first format is converted into the encoded data in the second format, so as to reduce the size of the encoded data file and improve the transmission efficiency.

For example, the second format is the H264 encoding format, and the first format is the MPEG-4 encoding format. The MPEG-4 encoding format has a higher speed in the encoding frame rate, but in the process of uploading the recorded video after completing the encoding, the H264 encoding format has a higher transmission efficiency. Therefore, in the embodiment of the present disclosure, the encoding is performed in the MPEG-4 encoding format, and after obtaining the encoded data, the encoded data is converted into the H264 encoding format, so as to reduce the size of the encoded data file and improve the transmission efficiency.

In one implementation of the present disclosure, after generating a recorded video based on the encoded data, the method further includes: in response to an operation on the recorded video, performing at least one of publishing and saving for the recorded video.

In the embodiment of the present disclosure, the operation on the recorded video includes: a trigger operation on a publish control and/or a save control in the terminal device.

In the embodiment of the present disclosure, in response to a trigger operation on a video publish control, the recorded video is sent to a server according to a preset video network transmission protocol, so as to allow users to download or pull the recorded video from the server to view. The video network transmission protocol includes any one of the Real Time Streaming Protocol (RTSP), Real Time Messaging Protocol (RTMP), Secure Reliable Transport Protocol (SRT) and Real-time Transport Protocol (RTP).

In one embodiment of the present disclosure, in response to a trigger operation on a video save control, the recorded video is saved to a local disk for users' subsequent viewing or publishing.

Figure 3:
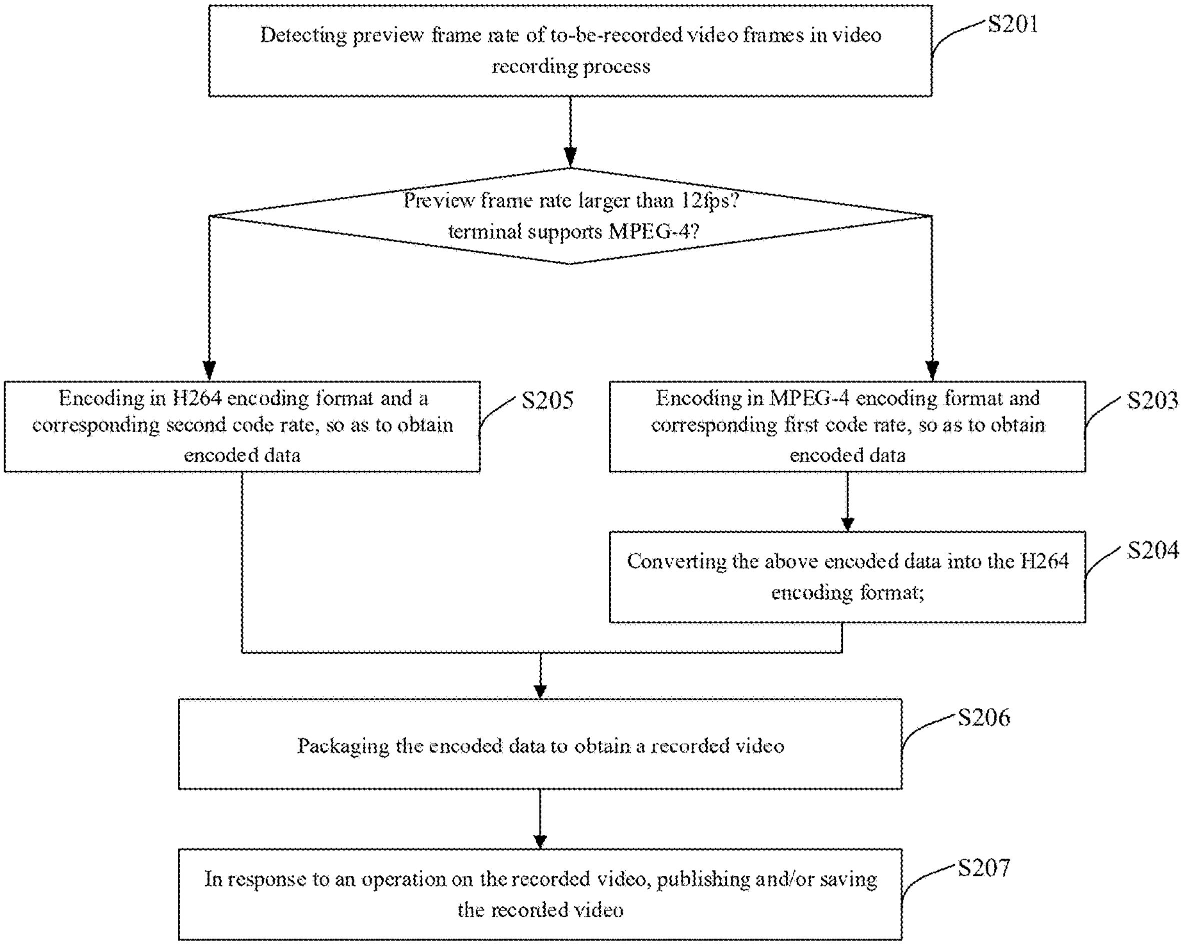
FIG. 3 is a flow diagram of a video recording method in an embodiment of the present disclosure.

FIG. 3 shows a flow diagram of a video recording method in the embodiment of the present disclosure. It mainly includes the following steps: S201, in a video recording process, detecting a preview frame rate of a to-be-recorded video; S202, judging whether the preview frame rate is larger than 12 fps and whether a terminal supports the MPEG-4 encoding format; S203, if the preview frame rate is larger than 12 fps and the terminal supports the MPEG-4 encoding format, then performing encoding in the MPEG-4 encoding format and a corresponding first code rate so as to obtain encoded data, wherein the first code rate is twice a second code rate; S204, converting the above encoded data into the H264 encoding format; S205, if the preview frame rate is less than 12 fps or the terminal does not support the MPEG-4 encoding format, then performing encoding in the H264 encoding format and the corresponding second code rate so as to obtain encoded data; S206, packaging the encoded data to obtain a recorded video; S207, in response to an operation on the recorded video, publishing and/or saving the recorded video.

In the embodiment of the present disclosure, an appropriate encoding mode is selected for encoding based on the preview frame rate in the video recording process, so that the loss of video frame rate is reduced, the video recording frame rate is improved, and the users' subsequent viewing experience is improved.

Figure 4:
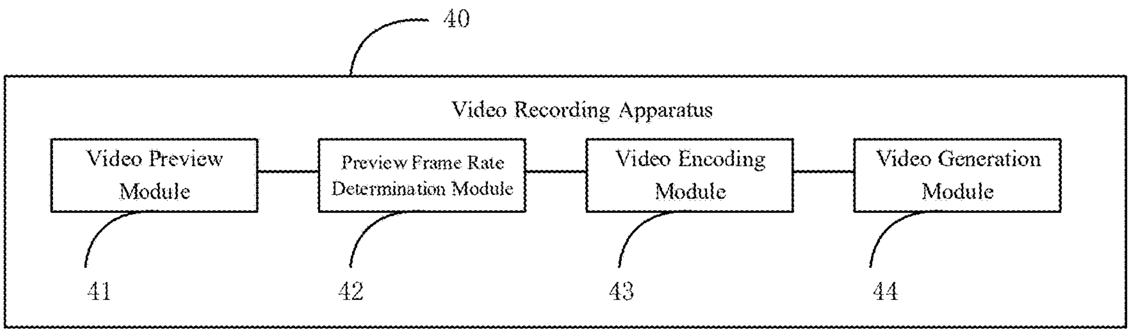
FIG. 4 is a schematic structural diagram of a video recording apparatus in an embodiment of the present disclosure.

FIG. 4 is a schematic structural diagram of a video recording apparatus in an embodiment of the present disclosure. The present embodiment can be applied to the case of video recording. The video recording apparatus can be implemented in software and/or hardware, and can be configured in an electronic device.

As shown in FIG. 4, a video recording apparatus 40 provided by the embodiment of the present disclosure mainly includes: a video preview module 41, a preview frame rate determination module 42, a video encoding module 43, and a video generation module 44.

The video preview module 41 is used for acquiring to-be-recorded video frames and previewing the to-be-recorded video frames in a video recording process. The preview frame rate determination module 42 is used for determining a preview frame rate in the process of previewing the to-be-recorded video frames. The video encoding module 43 is used for encoding the to-be-recorded video frames in an encoding format corresponding to the preview frame rate so as to obtain encoded data; wherein, if the preview frame rate is a first frame rate, then the encoding format is a first format; if the preview frame rate is a second frame rate, then the encoding format is a second format; the first frame rate is larger than the second frame rate, and an encoding frame rate corresponding to the first format is larger than that corresponding to the second format; the video generation module 44 is used for generating a recorded video based on the encoded data.

In one implementation of the present disclosure, if the encoding format is the first format, then the video encoding module 43 is specifically used for encoding the to-be-recorded video frames in the first format and a first code rate so as to obtain encoded data, wherein the first code rate is N times a second code rate, N is larger than or equal to 2, and the second code rate is a code rate corresponding to the second format.

In one implementation of the present disclosure, the video generation module 44 includes: a format conversion unit for converting the encoded data obtained based on the first format into encoded data corresponding to the second format; a video generation unit for generating a recorded video based on the encoded data corresponding to the second format.

In one implementation of the present disclosure, the apparatus further includes: a video saving module for performing, in response to an operation on the recorded video, at least one of publishing and saving the recorded video.

In one implementation of the present disclosure, the first format is the MPEG-4 encoding format, and the second format is the H264 encoding format.

In one implementation of the present disclosure, if the preview frame rate is the first frame rate, then the encoding format is the first format, including: if the preview frame rate is the first frame rate and the terminal supports the first format, then the encoding format is the first format.

The video recording apparatus provided by the embodiment of the present disclosure can execute the steps executed in the video recording method provided by the method embodiment of the present disclosure, and has the execution steps and beneficial effects, which will not be described here.

Figure 5:
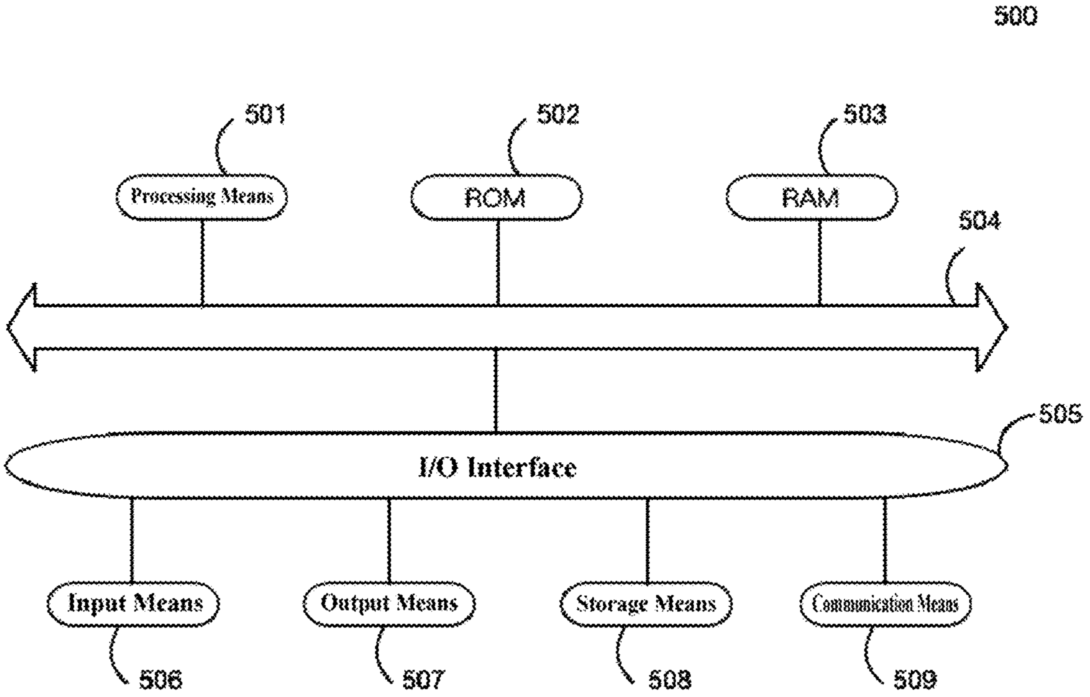
FIG. 5 is a schematic structural diagram of an electronic device in an embodiment of the present disclosure.

FIG. 5 is a schematic structural diagram of an electronic device in an embodiment of the present disclosure. Referring specifically to FIG. 5, there is shown a schematic structural diagram of an electronic device 500 adapted for implementing an embodiment of the present disclosure. The electronic device 500 in the embodiment of the present disclosure can include, but is not limited to, a mobile terminal such as a mobile phone, a notebook computer, a digital broadcast receiver, a Personal Digital Assistant (PDA), a Tablet Computer (PAD), a Portable Multimedia Player (PMP), an on-vehicle terminal (e.g. an on-vehicle navigation terminal), and a wearable terminal device, as well as a fixed terminal such as a digital TV, a desktop computer, and an intelligent home device, and the like. The electronic device shown in FIG. 5 is just an example, and should not bring any limitation to the functions and use scope of the embodiments of the present disclosure.

As shown in FIG. 5, the electronic device 500 can include a processing means (such as a central processor, a graphics processor, etc.) 501, which can execute various appropriate actions and processes according to a program stored in a Read-Only Memory (ROM) 502 or a program loaded from a storage means 508 into a Random Access Memory (RAM) 503, so as to implement the video recording method of the embodiments according to the present disclosure. In the RAM 503, various programs and data required for the operation of the electronic device 500 are also stored. The processing means 501, the ROM 502 and the RAM 503 are connected to each other via a bus 504. An input/output (I/O) interface 505 is also connected to the bus 504.

Generally, the following means can be connected to the I/O interface 505: an input means 506 including, for example, a touch screen, a touch pad, a keyboard, a mouse, a camera, a microphone, an accelerometer, a gyroscope, etc.; an output means 507 including, for example, a liquid crystal display (LCD), a speaker, a vibrator, etc.; a storage means 508 including, for example, a magnetic tape, a hard disk, etc.; and a communication means 509. The communication means 509 can allow the terminal device 500 to perform wireless or wired communication with other devices so as to exchange data. Although FIG. 5 shows the terminal device 500 having various means, it should be understood that it is not required to implement or provide all the devices shown. More or fewer means can alternatively be implemented or provided.

In particular, according to an embodiment of the present disclosure, the process described above with reference to the flow diagrams can be implemented as a computer software program. For example, an embodiment of the present disclosure includes a computer program product including a computer program carried on a non-transient computer readable medium, which contains program code for executing the method shown in the flow diagrams so as to implement the video recording method as described above. In such an embodiment, the computer program can be downloaded and installed from the network through the communication means 509, or installed from the storage means 508, or installed from the ROM 502. When the computer program is executed by the processing means 501, the above functions defined in the method of the embodiments of the present disclosure are executed.

It should be noted that the computer readable medium mentioned above in the present disclosure can be a computer readable signal medium or a computer readable storage medium or any combination of the above two. The computer readable storage medium can be, for example, but not limited to, an electrical, magnetic, optical, electromagnetic, infrared, or semiconductor system, apparatus or device, or a combination of any of the above. More specific examples of the computer readable storage medium can include, but are not limited to, an electrical connection with one or more wires, a portable computer disk, a hard disk, a Random Access Memory (RAM), a Read-Only Memory (ROM), an Erasable Programmable Read-Only Memory (EPROM or flash memory), an optical fiber, a portable Compact Disk Read-Only Memory (CD-ROM), an optical storage device, a magnetic storage device, or any appropriate combination of the above. In the present disclosure, the computer readable storage medium can be any tangible medium containing or storing a program, which can be used by or in combination with an instruction execution system, apparatus or device. In the present disclosure, the computer readable signal medium can include a data signal propagated in baseband or as part of a carrier wave, in which computer readable program code is carried. This propagated data signal can take many forms, including but not limited to an electromagnetic signal, an optical signal or any appropriate combination of the above. The computer readable signal medium can also be any computer readable medium other than the computer readable storage medium, which can send, propagate or transmit a program for use by or in connection with an instruction execution system, apparatus or device. The program code contained in the computer readable medium can be transmitted by any appropriate medium, including but not limited to: wires, optical cables, radio frequency (RF) and the like, or any appropriate combination of the above.

In some embodiments, clients and servers can communicate by using any currently known or future developed network protocol such as the HyperText Transfer Protocol (HTTP), and can be interconnected with digital data communication in any form or medium (for example, a communication network). Examples of the communication network include a Local Area Network ("LAN"), a Wide Area Network ("WAN"), the Interconnecting network (for example, the Internet) and an end-to-end network (for example, an ad hoc end-to-end network), as well as any currently known or future developed network.

The above computer readable medium can be contained in the above electronic device, or it can exist alone without being assembled into the electronic device.

The above computer readable medium carries one or more programs which, when executed by the terminal device, cause the terminal device to: judge whether the frame rate of the preview video is larger than a preset frame rate; if the frame rate of the preview video is larger than the preset frame rate, replace the second format with the first format, wherein an encoding frame rate corresponding to the second format is less than that corresponding to the first format; encode the preview video in the first format so as to obtain a first target video.

Optionally, when the above one or more programs are executed by the terminal device, the terminal device can also execute other steps described in the above embodiment.

Computer program code for executing the operations of the present disclosure can be written in one or more programming languages or a combination thereof, including but not limited to object-oriented programming languages, such as Java, Smalltalk, C++, as well as conventional procedural programming languages, such as "C" language or similar programming languages. The program code can be completely executed on a user's computer, partially executed on the user's computer, executed as an independent software package, partially executed on the user's computer and partially executed on a remote computer, or completely executed on the remote computer or a server. In the case involving the remote computer, the remote computer can be connected to a user's computer through any kind of network, including a Local Area Network (LAN) or a Wide Area Network (WAN), or can be connected to an external computer (for example, through the Internet using an Internet service provider).

The flow diagrams and block diagrams in the drawings illustrate the architecture, functions and operations of possible implementations of the system, method and computer program product according to various embodiments of the present disclosure. In this regard, each block in the flow diagrams or block diagrams can represent a module, a program segment, or a part of code that contains one or more executable instructions for implementing specified logical functions. It should also be noted that in some alternative implementations, the functions noted in the blocks can occur in a different order than those noted in the drawings. For example, two blocks shown in succession can actually be executed substantially in parallel, and they can sometimes be executed in the reverse order, depending on the functions involved. It is also to be noted that each block in the block diagrams and/or flow diagrams, and a combination of blocks in the block diagrams and/or flow diagrams, can be implemented by a dedicated hardware-based system that executes specified functions or operations, or by a combination of dedicated hardware and computer instructions.

The involved units described in the embodiments of the present disclosure can be implemented by software or hardware. The name of the unit does not constitute the limitation on the unit itself in some cases.

The functions described above herein can be at least partially executed by one or more hardware logic components. For example, without limitation, exemplary types of hardware logic components that can be used include: Field Programmable Gate Array (FPGA), Application Specific Integrated Circuit (ASIC), Application Specific Standard Product (ASSP), System on Chip (SOC), Complex Programmable Logic Device (CPLD) and so on.

In the context of the present disclosure, a machine readable medium can be a tangible medium that can contain or store a program for use by or in connection with an instruction execution system, apparatus or device. The machine readable medium can be a machine readable signal medium or a machine readable storage medium. The machine readable medium can include, but is not limited to, an electronic, magnetic, optical, electromagnetic, infrared, or semiconductor system, apparatus, device, or any appropriate combination of the above. More specific examples of the machine readable storage medium will include an electrical connection based on one or more wires, a portable computer disk, a hard disk, a Random Access Memory (RAM), a Read-Only Memory (ROM), an Erasable Programmable Read-Only Memory (EPROM or flash memory), an optical fiber, a portable Compact Disk Read-Only Memory (CD-ROM), an optical storage device, a magnetic storage device, or any appropriate combination of the above.

According to one or more embodiments of the present disclosure, the present disclosure provides a video recording method, comprising: acquiring to-be-recorded video frames and previewing the to-be-recorded video frames in a video recording process; determining a preview frame rate in the process of previewing the to-be-recorded video frames; encoding the to-be-recorded video frames in an encoding format corresponding to the preview frame rate so as to obtain encoded data, wherein, if the preview frame rate is a first frame rate, then the encoding format is a first format; if the preview frame rate is a second frame rate, then the encoding format is a second format; the first frame rate is larger than the second frame rate, and an encoding frame rate corresponding to the first format is larger than that corresponding to the second format; generating a recorded video based on the encoded data.

According to one or more embodiments of the present disclosure, the present disclosure provides a video recording apparatus, which comprises: a video preview module for acquiring to-be-recorded video frames and previewing the to-be-recorded video frame in a video recording process; a preview frame rate determination module for determining a preview frame rate in the process of previewing the to-be-recorded video frames; a video encoding module for encoding the to-be-recorded video frames in an encoding format corresponding to the preview frame rate so as to obtain encoded data, wherein, if the preview frame rate is a first frame rate, then the encoding format is a first format; if the preview frame rate is a second frame rate, then the encoding format is a second format; the first frame rate is larger than the second frame rate, and an encoding frame rate corresponding to the first format is larger than that corresponding to the second format; a video generation module for generating a recorded video based on the encoded data.

According to one or more embodiments of the present disclosure, the present disclosure provides an electronic device, including:

one or more processors;

a memory for storing one or more programs;

wherein the one or more programs, when executed by the one or more processors, cause the one or more processors to implement any said video recording method as provided by the present disclosure.

According to one or more embodiments of the present disclosure, the present disclosure provides a computer readable storage medium storing thereon a computer program which, when executed by a processor, implements any of the video recording methods as provided by the present disclosure.

An embodiment of the present disclosure also provides a computer program product including a computer program or instructions which, when executed by a processor, implement the video recording method described above.

An embodiment of the present disclosure also provides a computer program including instructions which, when executed by a processor, implement the video recording method described above.

The above description is only the explanation of the preferred embodiments of the present disclosure and the applied technical principles. It should be understood by those skilled in the art that the disclosure scope involved in the present disclosure is not limited to the technical solution formed by the specific combination of the above technical features, but also covers other technical solutions formed by any combination of the above technical features or their equivalent features without departing from the above disclosed concept, for example, a technical solution formed by a mutual replacement of the above features and technical features with similar functions as disclosed in the present disclosure (but not limited to).

Furthermore, although the operations are depicted in a particular order, this should not be understood as requiring that these operations be executed in the particular order shown or in a sequential order. Under certain circumstances, multitasking and parallel processing may be beneficial. Likewise, although several specific implementation details are contained in the above discussion, these should not be construed as limiting the scope of the present disclosure. Some features described in the context of a separate embodiment can also be implemented in combination in a single embodiment. On the contrary, various features described in the context of a single embodiment can also be implemented in multiple embodiments individually or in any appropriate sub-combination.

Although the present subject matter has been described in a language specific to structural features and/or methodological logical actions, it should be understood that the subject matter defined in the appended Claims is not necessarily limited to the specific features or actions described above. On the contrary, the specific features and actions described above are only exemplary forms of implementing the Claims.

What is claimed is:

1. A video recording method, comprising:

acquiring to-be-recorded video frames and previewing the to-be-recorded video frames in a video recording process;

determining a preview frame rate in a process of the previewing the to-be-recorded video frames;

encoding the to-be-recorded video frames in an encoding format corresponding to the preview frame rate so as to obtain encoded data, wherein, if the preview frame rate is a first frame rate, then the encoding format is a first format; if the preview frame rate is a second frame rate, then the encoding format is a second format; the first frame rate is larger than the second frame rate, and an encoding frame rate corresponding to the first format is larger than the encoding frame rate corresponding to the second format; and generating a recorded video based on the encoded data.

2. The video recording method according to claim 1, wherein, if the encoding format is the first format, then the encoding the to-be-recorded video frames in the encoding format corresponding to the preview frame rate so as to obtain the encoded data comprises:

encoding the to-be-recorded video frames in the first format and a first code rate to obtain the encoded data, wherein the first code rate is N times a second code rate, N is larger than or equal to 2, and the second code rate is a code rate corresponding to the second format.

3. The video recording method according to claim 1, wherein generating the recorded video based on the encoded data comprises:

converting the encoded data obtained based on the first format into second encoded data corresponding to the second format; and generating the recorded video based on the encoded data corresponding to the second format.

4. The video recording method according to claim 1, further comprising:

in response to an operation on the recorded video, performing at least one of publishing or saving on the recorded video.

5. The video recording method according to claim 1, wherein the first format is MPEG-4 encoding format, and the second format is H264 encoding format.

6. The video recording method according to claim 1, wherein, if the preview frame rate is the first frame rate, then the encoding format is the first format, comprises:

if the preview frame rate is the first frame rate and a terminal supports the first format, then the encoding format is the first format.

7. An electronic device, comprising:

one or more processors;

a storage device for storing one or more programs;

wherein the one or more programs, when executed by the one or more processors, cause the one or more processors to implement a video recording method comprising:

acquiring to-be-recorded video frames and previewing the to-be-recorded video frames in a video recording process;

determining a preview frame rate in a process of the previewing the to-be-recorded video frames;

encoding the to-be-recorded video frames in an encoding format corresponding to the preview frame rate so as to obtain encoded data, wherein, if the preview frame rate is a first frame rate, then the encoding format is a first format; if the preview frame rate is a second frame rate, then the encoding format is a second format; the first frame rate is larger than the second frame rate, and an encoding frame rate corresponding to the first format is larger than the encoding frame rate corresponding to the second format; and generating a recorded video based on the encoded data.

8. The electronic device according to claim 7, wherein, if the encoding format is the first format, then the encoding the to-be-recorded video frames in the encoding format corresponding to the preview frame rate so as to obtain the encoded data comprises:

encoding the to-be-recorded video frames in the first format and a first code rate to obtain the encoded data, wherein the first code rate is N times a second code rate, Nis larger than or equal to 2, and the second code rate is a code rate corresponding to the second format.

9. The electronic device according to claim 7, wherein generating the recorded video based on the encoded data comprises:

converting the encoded data obtained based on the first format into second encoded data corresponding to the second format; and generating the recorded video based on the encoded data corresponding to the second format.

10. The electronic device according to claim 7, further comprising:

in response to an operation on the recorded video, performing at least one of publishing or saving on the recorded video.

11. The electronic device according to claim 7, wherein the first format is MPEG-4 encoding format, and the second format is H264 encoding format.

12. The electronic device according to claim 7, wherein, if the preview frame rate is the first frame rate, then the encoding format is the first format, comprises:

if the preview frame rate is the first frame rate and a terminal supports the first format, then the encoding format is the first format.

13. A non-transitory computer readable storage medium storing thereon a computer program which, when executed by a processor, implements a video recording method comprising:

acquiring to-be-recorded video frames and previewing the to-be-recorded video frames in a video recording process;

determining a preview frame rate in a process of the previewing the to-be-recorded video frames;

encoding the to-be-recorded video frames in an encoding format corresponding to the preview frame rate so as to obtain encoded data, wherein, if the preview frame rate is a first frame rate, then the encoding format is a first format; if the preview frame rate is a second frame rate, then the encoding format is a second format; the first frame rate is larger than the second frame rate, and an encoding frame rate corresponding to the first format is larger than the encoding frame rate corresponding to the second format; and generating a recorded video based on the encoded data.

14. The non-transitory computer readable storage medium according to claim 13, wherein, if the encoding format is the first format, then the encoding the to-be-recorded video frames in the encoding format corresponding to the preview frame rate so as to obtain the encoded data comprises:

encoding the to-be-recorded video frames in the first format and a first code rate to obtain the encoded data, wherein the first code rate is N times a second code rate, Nis larger than or equal to 2, and the second code rate is a code rate corresponding to the second format.

15. The non-transitory computer readable storage medium according to claim 13, wherein generating the recorded video based on the encoded data comprises:

converting the encoded data obtained based on the first format into second encoded data corresponding to the second format; and generating the recorded video based on the encoded data corresponding to the second format.

16. The non-transitory computer readable storage medium according to claim 13, further comprising:

in response to an operation on the recorded video, performing at least one of publishing or saving on the recorded video.

17. The non-transitory computer readable storage medium according to claim 13, wherein the first format is MPEG-4 encoding format, and the second format is H264 encoding format.

18. The non-transitory computer readable storage medium according to claim 13, wherein, if the preview frame rate is the first frame rate, then the encoding format is the first format, comprises:

if the preview frame rate is the first frame rate and a terminal supports the first format, then the encoding format is the first format.

* * * * *